United States Patent Office 3,068,219
Patented Dec. 11, 1962

3,068,219
FORMAZANE DYES CONTAINING A HALOGEN-PYRIMIDYL SUBSTITUENT
Fabio Beffa, Basel, Switzerland, Paul Dussy, St-Louis, France, and Guido Schetty, Basel, Switzerland, assignors to J. R. Geigy A.-G., Basel, Switzerland
No Drawing. Filed Nov. 10, 1960, Ser. No. 68,362
Claims priority, application Switzerland Nov. 13, 1959
6 Claims. (Cl. 260—146)

The invention concerns metal-containing formazane dyestuffs which can be fixed onto cellulose fibres, processes for the production thereof, their use for the attainment of fast dyeings and the material fast dyed by the aid of these dyestuffs.

It has been found that metal-containing dyestuffs which correspond to the general Formula I

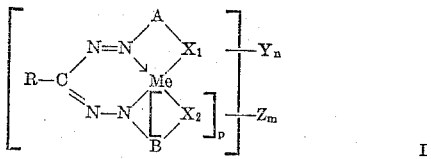

are distinguished by the pure shades and good fastness properties of the dyeings on cellulose and polyamide fibres obtained therewith.

In this Formula I:

R represents a monovalent radical, in particular a monovalent aromatic radical,

A and B each represent the radical of an aromatic diazo component which contains $X_1$ or $X_2$ in a position vicinal to the azo linkage, $X_1$ and $X_2$ each represent a metal binding substituent, preferably an oxy, carboxy or sulphonylamide group, Y represents a salt-forming, water solubilising group which dissociates strongly acid, preferably the sulphonic acid group, Z represents an amido group derived from an acylatable, preferably primary amino group, the acyl radical of which contains at least one mobile substituent which reacts with alkalies while splitting off an anion. The acyl radical of the amido group consists of, e.g. the radical of a β-halogen fatty acid or preferably the radical of a cyclic carbimide halide which also contains at least one halogen atom at a ring carbon atom vicinal to a tertiary ring nitrogen atom; it consists in particular of an azine ring of aromatic character having at least 2 tertiary ring nitrogen atoms, which azine ring contains at least one halogen atom of the atomic numbers 17–35 at ring carbon atoms vicinal to such ring nitrogen atoms, Me represents a heavy metal of the atomic numbers 24–29, preferably copper, or also nickel, n represents a positive whole number from 1–5, preferably 2–4, m represents a positive whole number of at most 2, and p represents 0 or 1.

The heavy metal is either tricyclically or dicyclically co-ordinated to the formazane compound depending on whether p is 1 or 0 respectively; the more valuable dyestuffs are obtained in the latter case. In the particularly valuable and, therefore, preferred dyestuffs according to the invention, also Me is copper and A and B are radicals of diazo components of the benzene or also the naphthalene series and R is an organic substituent of the benzene or also the naphthalene series.

The dyestuffs according to the invention are obtained by different processes. The first consists in reacting with suitable acylating agents, metal-containing dyestuffs of the general Formula I wherein Z is an acylatable amino group or a substituent containing an acylatable amino group, for example an m- or p-aminobenzoylamido group, and R, A, B, $X_1$, $X_2$, Y, Me, m, n and p have the meanings given above, the reaction being performed under such conditions that, on completion thereof, the dyestuff contains a substituent which easily reacts with alkalies while splitting off an anion, advantageously a mobile halogen atom of the atomic numbers 17—35. Principally, cyclic carbimide halides which contain the reactive grouping

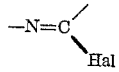

several times, wherein Hal represents halogen of the atomic numbers 17–35, are suitable acylating agents. In particular these are halogen azine compounds of aromatic character which contain at least 2 tertiary ring N atoms and at least two mobile halogen atoms of the atomic numbers 17–35 at the ring C atoms vicinal thereto; for example, 2,4,6-trichloro- or 2,4,6-tribromo- 1,3,5-triazine, 2-alkoxy-, 2-alkyl-, 2-phenyl-, 2-amino-, 2-alkylamino-, 2-phenylamino-, 2-sulphophenylamino-, 2-ureido- or 2-guanidino- 4, 6-dichloro- or 4,6-dibromo, 1,3,5-triazines, 2,4- or 4,6-dichloro- or -dibromo-pyrimidines which, in the remaining positions, contain further substituents in particular halogen atoms or negative groups such as the nitro, acyl, cyano or also only alkyl or phenyl groups, in addition tetrameric cyanogen chloride or bromide. Also β-halogen alkanoyl halides and in particular β-halogen alkenoyl halides with halogens of the atomic numbers 17–35 can be used, of these particular β-chloro- or β-bromo- crotonic acid chloride or bromide, also m-(β-chloroethylsulphamyl)-benzoyl chloride or m-(β-bromoethylsulphamyl)-benzoyl chloride. The reaction conditions are so chosen that premature exchange of mobile groups does not take place due either to too high pH of the reaction medium or to too high temperature. Thus, depending on the stability of the acylating agent or mobility of the exchange capabilities of the substituent in the group Z, the reaction is performed with the aqueous solutions of the alkali metal salts of the metal-containing dyestuffs at the lowest temperatures and pH values possible, possibly in the presence of agents which buffer the mineral acid such as alkali metal salts of low fatty acids, i.e. at pH values of about 2–7 and at temperatures of 0 to about 60° C. The acylating agents are used in at least equimolecular amount or, if several acylatable amino groups are present, in an amount which corresponds to a multiple of their numbers; they are employed in fine dispersion, for example as suspensions or emulsions, possibly with the addition of inert organic solvents which can be removed easily such as low ketones. The acylating agents are allowed to act until no more acylatable amino groups can be traced, for example by diazotising and coupling if the acylatable amino groups are primary, which is preferably the case. The dyestuffs according to the invention must also be carefully isolated and dried, for example by salting out of the alkali metal salts with sodium chloride in weakly acid solution and drying at a moderately raised temperature, preferably in vacuo.

The second process for the production of metal-containing dyestuffs according to the invention consists in reacting metal-free dyestuffs of the general Formula II with an agent which introduces a heavy metal of the atomic number 24–29.

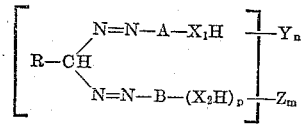

in this formula, R, A, B, $X_1$, $X_2$, Y, Z, m, n and p have the meanings given in Formula I. The metal-free dyestuffs are produced either from components which contain at least one substituent Z as defined while observing the precautionary measures described in the first process regarding mobility of the critical substituents, or the radical containing the reactive substituent is introduced into dyestuffs containing an acylatable amino group or containing a group which can be converted into such, in which case the introduction is performed possibly after such group has been converted into an acylatable amino group. In this process too, the acylating agents given in the first process are employed.

For the metallisation of the metal-free dyestuffs of the general Formula II, the usual agents giving off metal are employed for example, mineral acid salts of copper or nickel, advantageously in the presence of alkali metal salts of low fatty acids or of polybasic oxygen acids of phosphorus as mineral acid buffering agents. The metallisation is performed at moderate temperatures and at pH values of about 1–7 in order to prevent as far as possible too previous exchange of mobile substituents. The precautionary measures described above are also to be observed when isolating and drying the dyestuffs.

A third process for the production of metal-containing reactive dyestuffs according to the invention consists in starting from metallisable intermediate products of formazane compounds of the general Formula II, first metallising these and only then forming the complete dyestuff. Such intermediates correspond to the general Formula III

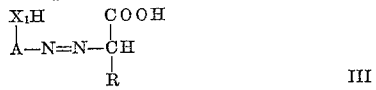

wherein $X_1H$, A and R have the meanings given in Formula II.

These intermediates are obtained, for example, by coupling 1 mol of an aryl diazonium compound with a methine compound, which latter, on completion of the coupling, contains at the methine C atom a substituent which can be converted into a carboxyl group, e.g. a cyano or carboxylic acid ester group. After converting such a substituent into the carboxyl group, the intermediate product of the above formula is treated with the agent giving off heavy metal and then coupled with 1 mol of an aryl diazonium compound which contains at least one amido group as defined by Z in Formula I, to form the metal-containing formazane dyestuff. The components are always so chosen that in all there are present at least one and not more than 5 strongly acid, salt-forming groups. The metallisation and the second coupling can also be performed in one step.

The starting materials used according to the invention are obtained by known methods, for example, by coupling 1 mol of an o-hydroxyaryl diazonium compound with an α-aryl-α-acylacetic ester, e.g. an α-phenyl-α-formylacetic acid alkyl ester, then saponifying the carbalkoxy group in alkaline medium to the carboxyl group and reacting, in the presence of metal salts, with 1 mol of a second aryldiazonium compound, the components being so chosen that in at least one of them there is an acylatable amino group or a substituent which can be converted into such. Advantageously the intermediate product contains at least one acylamino group, preferably in the radical of the diazo component B. In the metallised dyestuff, this acylamino group is then saponified in an alkaline medium into the acylatable amino group and this is acylated according to the invention with β-halogen fatty acid chloride or it is azinylated with azinyl halide containing more than one mobile halogen atom. The amino group in the acylatable starting materials usable according to the invention is preferably primary.

As diazo components containing a metallisable group in the o-position, mainly those usual in the production of azo dyestuffs are employed, i.e. principally o-hydroxy- and o-carboxy-aminobenzenes and -aminonaphthalenes which can be substituted by halogen, cyano, nitro, alkyl, aralkyl, cycloalkyl and aryl groups, by alkoxy, aryloxy, sulphonic acid, carboxylic acid, carboxylic acid ester, sulphonic acid ester, sulphonic acid alkyl-, sulphonic acid aralkyl- or sulphonic acid-arylamide groups, by alkylcarbonyl or arylcarbonyl, alkylsulphonyl or arylsulphonyl groups, by alkylamino, aralkylamino, cycloalkylamino or arylamino groups, and, finally, by acylamino groups. In the latter case, the acylamino groups are possibly saponified and converted after completion of the dyestuff formation into an amido group as defined. It is also possible to use diazo components which, instead of the o-hydroxyl or o-carboxyl groups mentioned above, contain substituents which as such are not metallisable but which can be converted into metallisable groups after the coupling. Such groups are, in particular, ether groups, acyloxy groups and disulphonylamido groups.

The diazo components of the type mentioned above, in particular the o-carboxy- and o-disulphonylamido- aryl diazonium compounds can also be converted by reduction into the corresponding hydrazine compounds and then used as starting materials for the process by the hydrazone method.

The compounds known in azo dyestuff chemistry are also used advantageously as diazo components not having a metallisable group in the o-position. Examples of such are aminobenzenes and aminonaphthalenes, and also aminoazoles such as 2-aminothiazoles, aminobenzthiazoles, all of which can still contain substituents of the type mentioned above. If the acylated or acylatable amino group which, as defined, must be present, is present in one of these diazo components not having metallisable groups in the o-position, then it is advantageously an m- or p-monoacylaminobenzene diazonium compound possibly further substituted in the benzene nucleus. In particular it is an m- or p-monoacylamino- or an m- or p-monoazinylamino- diazobenzene-o-sulphonic acid.

A further method for the production of the starting dyestuffs usable according to the invention consists, for example, in condensing an aromatic aldehyde first with a hydrazine from an aromatic amine and coupling the hydrazone obtained with a diazonium compound from a second aromatic amine, but at least one of these two amines must contain a metal binding substituent in the o-position to the amino group. In this case too, the components are so chosen that the starting dyestuff contains the amido group Z or a substituent which can be converted into an acylatable amino group, which substituent is converted into the amino group in any suitable step of the dyestuff synthesis and is acylated or azinylated according to the invention. The compounds listed above are used as aromatic amines with or without the metal binding substituent in the o-position. As aldehydes for the hydrazone formation, principally the aromatic-isocyclic ones are used as they lead to particularly valuable mesoaryl formazane dyestuffs. For example, benzaldehyde, benzaldehyde-2-sulphonic acid, benzaldehyde-2,4-disulphonic acid, or 2- or 4-chloro-benzaldehyde are used.

Preferred dyestuffs correspond to the formula

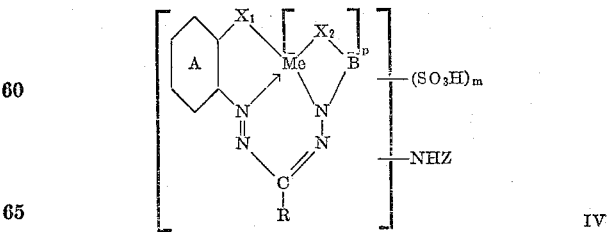

wherein
R represents a member selected from the group consisting of phenyl, chlorophenyl, and naphthyl radicals,
B represents a member selected from the group consisting of phenyl and naphthyl radicals,
$X_1$ and $X_2$ each represent a metal binding group in o-position to the azo bond, selected from the group consisting of —O—, —COO— and —NSO$_2$-lower alkyl, Z represents the radical of an acid halide which contains a substituent which, with alkalies, splits off as anion, Me represents a heavy metal selected from the group consisting of Cu and Ni, m represents an integer from 2 to 4 inclusive and p represents one of the numerals 0 and 1.

The —NHZ and the sulphonic acid groups therein are bound at the aromatic radicals A, B and R. If p is 1, then Me is tricyclically co-ordinated to the formazane compound, but if p is 0 then Me is dicyclically co-ordinated.

Examples of the reactive radical Z are principally:

(a) halogen-pyrimidyl radicals such as dihalogen pyrimidyl radicals, e.g., the 4,6-dichloropyrimidyl-(2) radical or 2,6-dichloropyrimidyl-(4) radical, which can contain a substituent in the remaining position, in particular a further halogen atom such as, e.g. the 4,5,6-trichloropyrimidyl-(2) radical or 2,5,6-trichloropyrimidyl-(4) radical, (b) halogen-1,3,5-triazinyl radicals which in the remaining position contain a substituent, in particular halogen, amino or alkoxy groups, e.g., the 2,4-dichloro- or 2-methoxy-4-chloro-1,3,5-triazinyl radicals, (c) β-halogen fatty-acid radicals such as β-halogen alkanoyl radicals and, particularly, β-halogen alkenoyl radicals such as, e.g., the β-chlorocrotonyl radical. The radical Z can also be halogen pyrimidoyl radicals and m-(β-halogen ethylsulphamyl)-benzoyl radicals. Halogen in the radicals mentioned is, in particular, chlorine but it can also be bromine.

In addition, dyestuffs which contain the dischloropyrimidylamino group and, especially, the trichloropyrimidylamino group are preferred. It is difficult to determine from the dyestuff molecule which halogen atom of the tri- or tetra- halogen pyrimidine is exchanged for the dyestuff amino radical. Very probably the latter radical is bound to the pyrimidine ring in the 2- or 4-position. In this case, the halogen atoms are in 4,6- or 2,6- positions or in the 4,5,6- or 2,5,6-positions. This radical has the structure

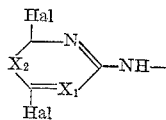

in which of $X_1$ and $X_2$ one is tertiary nitrogen (=N—) and the other is either =CH or =C—Hal.

Particularly valuable dyestuffs are those embraced by Formula IV in which p=0, which then correspond to the formula

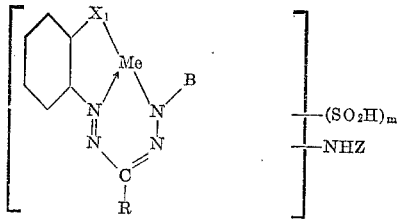

wherein R, B, $X_1$, Z and m have the meanings given in Formula IV. Again, of these dyestuffs the most valuable have the following formula

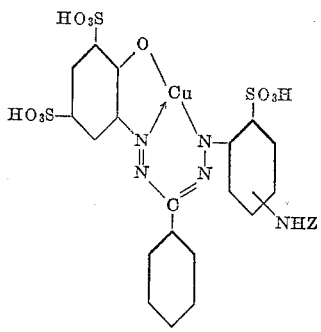

wherein Z represents a member selected from the group consisting of halogen-1,3,5-triazinyl, halogen-pyrimidyl and β-halogen fatty acid radicals, the halogen having atomic numbers 17 and 35.

The reactive dyestuffs containing heavy metal according to the invention are dark powders which, in the form of their alkali metal salts dissolve well in water. They are suitable for the dyeing and printing of natural and regenerated cellulose fibres in red-brown, violet, blue-violet, blue, navy blue, green to grey shades. The cellulose material is impregnated and printed, advantageously at a low temperature, e.g., at 20–50° C., with the possibly thickened dyestuff solution and the dyestuff is then fixed by treating with acid binding agents. Natural and synthetic polyamide fibres are dyed advantageously in an acid bath or they are printed with neutral to weakly acid printing inks and then the dyeing or prints are treated with acid binding agents. Examples of such agents are sodium carbonate, di- and tri-sodium phosphate, caustic soda lye, and, at temperatures of above 50° C., also sodium bicarbonate. Although the treatment with these agents can be performed even at room temperature or at slightly elevated temperature, often a better result is attained at a raised temperature of, e.g. 70–160° C. (advantageously after a mild intermediate drying of the impregnated or printed goods). Instead of an alkaline after-treatment, the acid binding agent, advantageously in the form of alkali bicarbonates, can also be added to the impregnating liquors or printing pastes, particularly when the fixing is performed hot, and then the dyeing is developed by heating or steaming for a short time at temperatures of over 100–160° C. In this process, the addition of hydrotropic substances to the printing inks and impregnating liquors is advantageous, for example, the addition of urea in amounts of 10–200 g. per litre of printing ink or impregnating liquor.

The new dyestuffs are bound chemically to the fibre by the treatment with acid binding agents and, after soaping to remove any non-fixed dyestuff, the cellulose dyeings obtained have excellent wet fastness properties and very good fastness to light.

The following examples serve to illustrate the invention. The temperatures are given in degrees centigrade. Where not otherwise stated, parts are given as parts by weight. The relationship of parts by weight to parts by volume is as that of grammes to cubic centimetres.

EXAMPLE 1

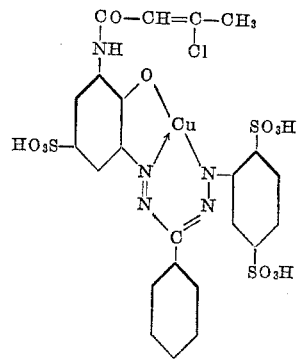

63.3 parts of the copper complex compound of N-(2-hydroxy-3-aminophenyl-5-sulphonic acid)-N'-(phenyl-2', 5'-disulphonic acid)-ms-phenyl formazane (obtained by coupling diazotised 6-acetylamino-2-amino-1-hydroxybenzene-4-sulphonic acid with the hydrazone from benzaldehyde and phenyl hydrazine-2,5-disulphonic acid, coppering and saponifying the acetylamino group) are dissolved in 1200 parts of water with a pH of 6.0 to 6.5. 21 parts of β-chlorocrotonic acid chloride in 100 parts of acetone are added dropwise to this solution within 1 hour at 45–50° and an aqueous solution of sodium carbonate is simultaneously added dropwise so that the reaction mixture always remains neutral. As soon as no more starting dyestuff can be traced, the dyestuff is precipitated with sodium chloride, filtered off, washed with sodium chloride solution and carefully dried in vacuo.

It is a dark powder which dissolves in warm water with a blue colour.

2 parts of the dyestuff are dissolved in 4000 parts of water and 20 parts of sodium carbonate are added. 100 parts of cotton are introduced at 40–45° and the dyebath is heated within 30 minutes to 80–85° and sodium chloride is simultaneously added so that at the end the content is 150 parts thereof per litre. Dyeing is continued for 1 hour at this temperature. The goods are then rinsed and soaped at the boil for 30 minutes. A fast blue dyeing is obtained.

Further dyestuffs according to the invention are obtained by using the metal-containing amino formazane compounds given in columns II and III of the following table and the acylating agents given in colum IV thereof under the reaction conditions given in columns V and VI thereof according to the process described in Example 1. The dyestuffs obtained dye cotton in the shades given in column VII of the table.

water, 250 parts by volume of dioxan and 10.5 parts by volume of a 10 N-caustic soda lye solution in the presence of such amounts of calcinated sodium carbonate that after the addition of the diazonium compound, the reaction mixture has a weakly phenolphthalein alkaline reaction. On completion of the coupling, the reaction is made weakly alkaline to brilliant yellow paper by the addition of concentrated hydrochloric acid, the mixture is diluted and boiled. After adding sufficient 10 N-caustic soda lye to ensure a strong alkaline reaction until the end of the saponification, the reaction product is refluxed for 10–20 minutes.

The solution of the saponification product is then made weakly alkaline to litmus paper with glacial acetic acid and a copper sulphate solution (corresponding to 7 parts of copper) is added. The mixture is then coupled at 0–10° with the diazonium salt obtained by diazotising 37 parts of the condensation product from 1,3-diaminobenzene-4-sulphonic acid and 2,4,5,6-tetrachloropyrimidine as described below.

18.8 parts of 1,3-diaminobenzene-4-sulphonic acid are dissolved in 200 parts of water and the reaction is made

*Table I*

| I | II | III | IV | V | VI | VII |
|---|---|---|---|---|---|---|
| No. | Amino formazane dyestuff | Metal | Acylating agent | Acylating conditions, pH | Acylating conditions, temp., C. | Shade on cotton |
| 1 | N-(2-hydroxy-3-aminophenyl-5-sulphonic acid)-N'-(phenyl-2',5'-disulphonic acid)-ms-phenyl formazane. | Cu | 2,4,6-trichloropyrimidine | 6.0–6.5 | 40–50 | Blue. |
| 2 | ----do---- | Cu | 2,4,5,6-tetrachloropyrimidine | 6.0–6.5 | 40–50 | Do. |
| 3 | N-(2-hydroxyphenyl-3,5-disulphonic acid)-N'-(4'-aminophenyl-2'-sulphonic acid)-ms-phenyl-formazane. | Cu | 5-methyl-2,4,6-trichloropyrimidine | 7.0–7.5 | 80–85 | Do. |
| 4 | ----do---- | Cu | 2-ureido-4,6-dichloro-1,3,5-triazine | 5.0–5.5 | 30–35 | Do. |
| 5 | ----do---- | Cu | 2-methoxy-4,6-dichloro-1,3,5-triazine | 5.0–5.5 | 30–35 | Do. |
| 6 | ----do---- | Cu | Chloromaleic acid anhydride | 6.5–7.0 | 30–35 | Do. |
| 7 | N-(2-hydroxyphenyl-3,5-disulphonic acid)-N'-(5'-aminophenyl-2'-sulphonic acid)-ms-phenylformazane. | Ni | 2,6-dichloropyrimidine-4-carboxylic acid chloride. | 6.5–7.0 | 30–35 | Violetty brown. |
| 8 | ----do---- | Ni | Chloroacrylic acid chloride | 6.5–7.0 | 30–35 | Do. |
| 9 | N-(2-methylsulphonylaminophenyl)-N'-(4'-aminophenyl-2'-sulphonic acid)-ms-o-sulphonic acid phenyl formazane. | Cu | 2-(2',5'-disulphonic acid phenylamino)-4,6-dichloro-1,3,5-triazine. | 6.0–6.5 | 40–50 | Blue. |
| 10 | N-(2-methylsulphonylaminophenyl)-N'-(phenyl-2',5'-disulphonic acid)-ms-m-aminophenyl formazane. | Cu | ----do---- | 6.0–6.5 | 40–50 | Do. |
| 11 | N-(2-ethylsulphonylaminophenyl)-N'-(phenyl-2',5'-disulphonic acid)-ms-m-aminophenyl formazane. | Cu | 2-methoxy-4,6-dichloro-1,3,5-triazine | 5.0–5.5 | 30–35 | Do. |
| 12 | N-(2-hydroxyphenyl-3,5-disulphonic acid)-N'-(phenyl-2',5'-disulphonic acid)-ms-m-aminophenyl formazane. | Cu | β-Bromocrotonic acid chloride | 6.5–7.0 | 30–35 | Do. |
| 13 | ----do---- | Cu | 2,4,5,6-tetrachloropyrimidine | 6.0–6.5 | 40–50 | Do. |
| 14 | N-(2-hydroxyphenyl-3,5-disulphonic acid)-N'-(4'-aminophenyl-2'-sulphonic acid)-ms-naphthyl-(1)-formazane. | Cu | 2-(2',5'-disulphonic acid phenylamino)-4,6-dichloro-1,3,5-triazine. | 6.0–6.5 | 40–50 | Do. |
| 15 | ----do---- | Cu | Cyanuric chloride | 2.0–2.5 | 0–5 | Do. |
| 16 | N-(2-hydroxy-3 aminophenyl-5-sulphonic acid)-N'-(naphthyl-(1)-3',8'-disulphonic acid)-ms-phenyl formazane. | Cu | 2-ureido-4,6-dichloro-1,3-5-triazine | 5.0–5.5 | 30–35 | Grey. |
| 17 | ----do---- | Cu | 2,4,5,6-tetrachloropyrimidine | 6.0–6.5 | 40–50 | Do. |

EXAMPLE 2

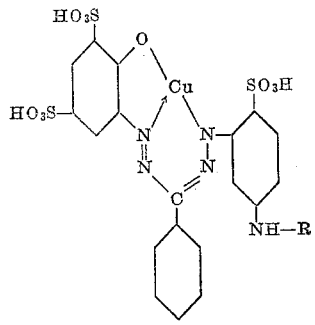

26.9 parts of 2-amino-1-hydroxybenzene-4,6-disulphonic acid are indirectly diazotised by the usual method. The suspension of the diazonium compound is added dropwise at 0–10° while stirring well to a suspension of 20.4 parts of phenylformyl acetic acid ethyl ester in 200 parts of neutral with sodium carbonate. 26.2 parts of 2,4,5,6-tetrachloropyrimidine dissolved in 100 parts of acetone are added dropwise to this solution at 20–25° and simultaneously an aqueous trisodium phosphate solution is so added dropwise that the reaction mixture always has a neutral reaction. On completion of the reaction, the reaction product is precipitated with sodium chloride, filtered off, dissolved in 300 parts of water and diazotised at 0° with 25 parts of 30% hydrochloric acid and 6.9 parts of sodium nitrite. The yellow suspension of the diazonium salt is made neutral to congo paper with sodium acetate.

After heating the reaction mixture to 45°, the isomeric mixture of the copper-containing dyestuff of the formula given above in which R is the 4,5,6-trichloropyrimidyl-(2) radical or the 2,5,6-trichloropyrimidyl-(4) radical, is precipitated by the addition of sodium chloride, filtered off, washed with sodium chloride solution and dried in vacuo. It is a dark powder which dissolves in water with a blue colour.

Cotton is treated in the foulard at 50° with a 1% solution of this dyestuff which also contains 20 parts of sodium carbonate and 200 parts of urea per litre. The impregnated goods are dried, then heated for 4 minutes at 140–160° and finally soaped at the boil for 30 minutes. A level blue dyeing is obtained which is fast to boiling.

EXAMPLE 3

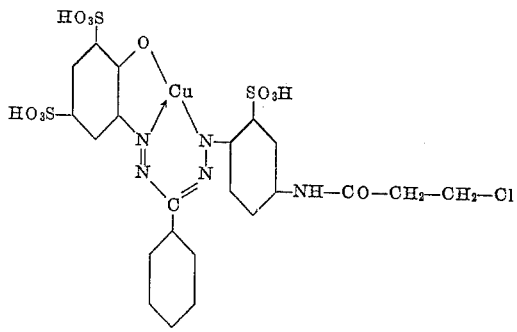

26.9 parts of 2-amino-1-hydroxybenzene-4,6-disulphonic acid are indirectly diazotised by the usual method, coupled with 20.4 parts of phenylformyl acetic acid ethyl ester under the conditions described in Example 2 and the ester group in the coupling product is saponified with dilute caustic soda lye.

The solution of the saponification product is then made neutral with acetic acid, treated with a solution of copper sulphate (corresponding to 7 parts of copper) and then coupled with the diazonium salt, the reaction of which has been made neutral, which is obtained by diazotising 28 parts of the condensation product from 1,4-diaminobenzene-2-sulphonic acid and β-chloropropionic acid chloride.

After heating to 45–50°, the copper-containing formazane complex of the above formula is precipitated by the addition of the sodium chloride, filtered off, washed with sodium chloride solution and carefully dried in vacuo. It is a dark powder which dissolves in water with a blue colour.

If cotton is impregnated with a 2% aqueous solution of this dyestuff thickened with sodium alginate, which solution contains 200 g. of urea and 20 g. of sodium carbonate per litre, and after a mild drying the goods are steamed neutral for 5 to 10 minutes or are heated for 5 minutes at 130–150°, then soaped hot, rinsed and dried, a beautiful blue dyeing is obtained which is fast to washing.

Further dyestuffs according to the invention are obtained by the processes described in Examples 2 and 3 using the metallising agents given in column II of the following table and the diazonium compounds given in column III thereof instead of the compounds mentioned above, which dyestuffs produce dyeings of the shades given in column IV.

Table 2

| I No. | II Metallising agent | III Second diazonium compound from— | IV Shade of metal containing formazane dyestuff on cotton |
|---|---|---|---|
| 1 | Nickel sulphate | 1-amino-5-trichloropyrimidylaminobenzene-2-sulphonic acid | Violetty brown. |
| 2 | Copper sulphate | 1-amino-5-dichloropyrimidylaminobenzene-2-sulphonic acid | Blue. |
| 3 | Nickel sulphate | ......do...... | Violetty brown. |
| 4 | Copper sulphate | 1-amino-5,β-chlorocrotonylaminobenzene-2-sulphonic acid | Blue. |
| 5 | Nickel sulphate | ......do...... | Violetty brown. |
| 6 | Copper sulphate | 1-amino-4-dichloropyrimidylaminobenzene-2-sulphonic acid | Blue. |
| 7 | ......do...... | 1-amino-4-(2',6'-dichloropyrimidine-4'-carbonylamino)-benzene-2-sulphonic acid | Do. |
| 8 | ......do...... | 1-amino-4,β-bromocrotonylaminobenzene-2-sulphonic acid | Do. |
| 9 | ......do...... | 1-amino-4-(p-trichloropyrimidylaminophenyl)-benzene-2-sulphonic acid | Do. |
| 10 | ......do...... | 1-amino-4-(p-dichloropyrimidylaminophenyl)-benzene-2-sulphonic acid | Do. |
| 11 | ......do...... | 1-amino-4-(dichloro-1,3,5-triazinylamino)-benzene-2-sulphonic acid | Do. |
| 12 | ......do...... | 1-amino-5-(dichloro-1,3,5-triazinylamino)-benzene-2-sulphonic acid | Do. |
| 13 | ......do...... | 1-amino-4-(dibromo-1,3,5-triazinylamino)-benzene-2-sulphonic acid | Do. |
| 14 | ......do...... | 1-amino-5-(dibromo-1,3,5-triazinylamino)-benzene-2-sulphonic acid | Do. |
| 15 | ......do...... | 1-amino-4-dibromopyrimidylaminobenzene-2-sulphonic acid | Do. |
| 16 | ......do...... | 1-amino-5-dibromopyrimidylaminobenzene-2-sulphonic acid | Do. |
| 17 | ......do...... | 1-amino-5-bromoacroylamino-benzene-2-sulphonic acid | Do. |
| 18 | ......do...... | 1-amino-4-bromoacroylamino-benzene-2-sulphonic acid | Do. |
| 19 | ......do...... | 1-amino-4-[m-(β-chloroethylsulphamyl)-benzoylamino[-benzene-2-sulphonic acid | Do. |
| 20 | ......do...... | 1-amino-5-[m-(β-chloroethylsulphamyl)-benzoylamino[-benzene-2-sulphonic acid | Do. |
| 21 | ......do...... | 1-amino-4-(amino-chloro-1,3,5-triazinylamino)-benzene-2-sulphonic acid | Do. |
| 22 | ......do...... | 1-amino-5-(amino-chloro-1,3,5-triazinylamino)-benzene-2-sulphonic acid | Do. |

The following Table 3 contains further dyestuffs according to the invention having similar properties which are produced by using equivalent amounts of the components given in columns II–V according to the processes fully described in example 2.

Table 3

| I No. | II Metallising agent | III First diazonium compound from— | IV Coupling component | V Second diazonium compound from— | VI Shade of metal containing formazane dyestuff on cotton |
|---|---|---|---|---|---|
| 1 | Copper sulphate | 2-amino-4-methyl sulphonyl-1-hydroxybenzene-6-sulphonic acid | Pheynylformyl acetic acid ethyl ester | 1-amino-4-trichloropyrimidylaminobenzene-2-sulphonic acid | Blue. |
| 2 | ......do...... | ......do...... | ......do...... | 1-amino-4-dichloropyrimidylaminobenzene-2-sulphonic acid | Do. |
| 3 | ......do...... | ......do...... | ......do...... | 1-amino-4-β-chloroacryloylaminobenzene-2-sulphonic acid | Do. |
| 4 | ......do...... | 2-amino-1-hydroxybenzene-4,6-disulphonic acid | p-Chorophenylformyl acetic acid ethyl ester | 1-amino-4-trichloropyrimidylaminobenzene-2-sulphonic acid | Do. |
| 5 | ......do...... | ......do...... | ......do...... | 1-amino-4-dichloropyrimidylaminobenzene-2-sulphonic acid | Do. |

EXAMPLE 4

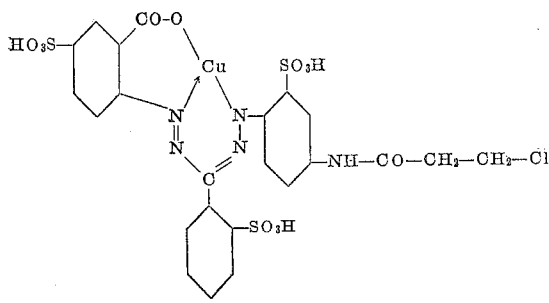

69 parts of N-(2-carboxyphenyl-4-sulphonic acid)-N'-(4'-β-chloropropionylaminophenyl-2'-sulphonic acid)-ms-o-sulphonic acid phenylformazane (obtained by coupling diazotised 4-β-chloropropionylamino-1-aminobenzene-2-sulphonic acid with the hydrazone from benzaldehyde-2-sulphonic acid and phenyl hydrazine-2-carboxylic acid-4-sulphonic acid by the known method), are dissolved with a neutral reaction in 1200 parts of water.

The dyestuff is converted into the corresponding copper complex compound by the addition of 150 parts of copper sulphate solution (corresponding to 7 parts of copper). The copper-containing dyestuff is then precipitated by the addition of sodium chloride, filtered off, washed with dilute sodium chloride solution and carefully dried in vacuo.

It is a dark powder which dissolves in water with a violet colour.

If cotton is impregnated with a 2% aqueous solution of this dyestuff thickened with sodium alginate which solution also contains 200 g. of urea and 20 g. of sodium carbonate per litre, and after a mild drying, the goods are steamed neutral for 5–10 minutes or heated for 5 minutes at 130–150°, soaped hot, rinsed and dried, then a blue-violet dyeing which is fast to washing is obtained.

If, in the process described in the above example, instead of the formazane compound from 4-β-chloropropionylamino-1-aminobenzene-2-sulphonic acid, the metal-free formazane compounds obtained from the 4-trichloropyrimidyl-, 4-dichloropyrimidyl- and 4-β-bromocrotonylamino-1-aminobenzene-2-sulphonic acids are used, dyestuffs having similarly good properties are produced.

EXAMPLE 5

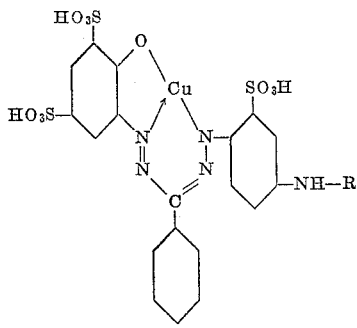

26.9 parts of 2-amino-1-hydroxybenzene-4,6-disulphonic acid are indirectly diazotised by the usual method and coupled with 20.4 parts of phenylformyl acetic acid ethyl ester under the conditions given in Example 2.

After adding sufficient caustic soda lye to ensure a strong alkaline reaction until the end of the saponification, the coupling product is refluxed for 10 minutes.

The solution of the saponification product is then made acid to litmus paper with glacial acetic acid and is combined with the neutralised diazonium salt obtained by diazotising 37 parts of the condensation product of 1,4-diaminobenzene-2-sulphonic acid and 2,4,5,6-tetrachloropyrimidine at 0–10°.

A copper sulphate solution (corresponding to 7 parts of copper) is then added to the coupling mixture. After heating for a short time at 45°, the isomeric mixture of the copper-containing dyestuff of the formula given above wherein R is the 4,5,6-trichloropyrimidyl-(2) radical or the 2,5,6-trichloropyrimidyl-(4) radical, is precipitated by the addition of sodium chloride, filtered off, washed with sodium chloride solution and carefully dried in vacuo. It is a dark powder which dissolves in water with a blue colour.

If cotton is impregnated with a 2% aqueous solution of this dyestuff thickened with sodium alginate which solution also contains 200 g. of urea and 20 g. of sodium bicarbonate per litre and, after a mild drying, the goods are steamed neutral for 5 to 10 minutes or are heated for 5 minutes at 130–150°, soaped hot and then rinsed and dried, a beautiful blue dyeing which is fast to washing is obtained.

EXAMPLE 6

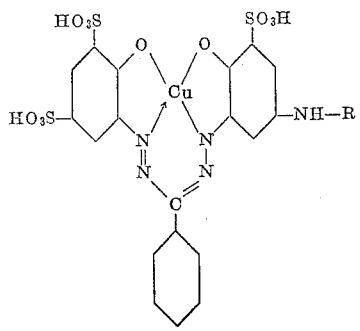

64.8 parts of the copper complex compound of N-(2-hydroxy-5-aminophenyl-3-sulphonic acid)-N'-(2'-hydroxyphenyl-3',5'-disulphonic acid)-ms-phenylformazane (obtained by coupling equimolecular amounts of diazotised 2-amino-1-hydroxybenzene-4,6-disulphonic acid and 4-acetylamino-2-amino-1-hydroxybenzene-6-sulphonic acid in the presence of copper salts with phenyl formyl acetic acid ethyl ester by a known method and then saponifying the acetylamino group with dilute caustic soda lye) are dissolved in 1200 parts of water at a pH of 6.0–6.5. 24 parts of 2,4,5,6-tetrachloropyrimidine in 100 parts of acetone and an aqueous solution of sodium carbonate are added dropwise simultaneously to this solution within 1 hour at 45–50° in such a manner that the pH of the reaction mixture always remains at 6.0–6.5. As soon as the condensation is complete, the isomeric mixture of the dyestuffs of the above formula in which R is the 4,5,6-trichloropyrimidyl-(2) radical or the 2,5,6-trichloropyrimidyl-(4) radical, is precipitated by the addition of sodium chloride, filtered off, washed with dilute sodium chloride solution and carefully dried in vacuo. It is a dark powder which dissolves in water with a blue colour.

Cotton is treated at 50° in the foulard with a 1% solution of this dyestuff which also contains 20 parts of sodium carbonate and 200 parts of urea per litre. The impregnated goods are dried, heated for 4 minutes at 140–160° and finally soaped at the boil for 30 minutes. A level, blue dyeing which is fast to boiling is obtained.

EXAMPLE 7

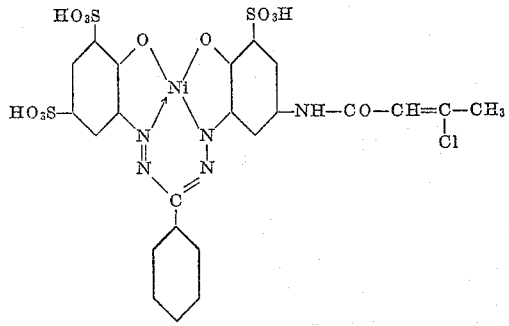

64.3 parts of the nickel complex compound of N-(2-hydroxy - 5 - aminophenyl - 3-sulphonic acid).-N'-(2'-hydroxyphenyl-3',5'-disulphonic acid)-ms-phenylformazane (obtained by coupling equimolecular amounts of diazotised 2-amino-1-hydroxybenzene-4,6-disulphonic acid and 4 - acetylamino - 2 - amino-1-hydroxybenzene-6-sulphonic acid with phenylformyl acetic acid ethyl ester by a known method in the presence of nickel salts and then saponifying the acetylamino group with dilute caustic soda lye) are dissolved with a neutral reaction in 1200 parts of water. 21 parts of β-chlorocrotonic acid chloride in 100 parts of acetone and an aqueous sodium carbonate solution are added dropwise simultaneously at 30–35° and within 1 hour to this solution in such a way that the reaction mixture always remains neutral. As soon as no more free amine can be traced, the dyestuff is precipitated by the addition of sodium chloride, filtered off and washed with dilute sodium chloride solution. After drying in vacuo, the dyestuff is a dark powder which dissolves in water with a violet colour.

2 parts of the dyestuff are dissolved in 4000 parts of water and 20 parts of caustic soda lye 36° Bé. are added. 100 parts of cotton are introduced into the dyebath at 40–45° and the bath is heated within 30 minutes to 80–85°. At the same time, sufficient sodium chloride is added to bring the final content to 150 parts per litre, and then dyeing is performed for 1 hour at 80–85°. The goods are then rinsed and soaped at the boil for 30 minutes whereby the soap solution is only slightly coloured. A fast violet dyeing is obtained.

EXAMPLE 8

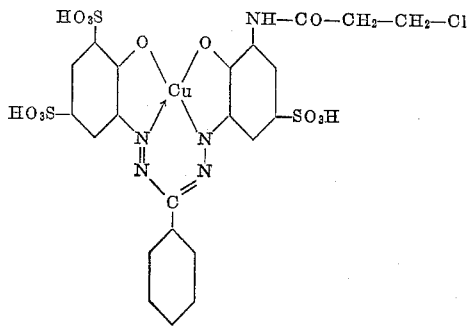

64.8 parts of the copper complex compound of N-(2-hydroxy - 3 - aminophenyl - 5-sulphonic acid)-N'-(2'-hydroxyphenyl-3'5'-disulphonic acid)-ms-phenylformazane (obtained by coupling equimolecular amounts of diazotised 2-amino-1-hydroxybenzene-4,6-disulphonic acid and b - acetylamino - 2 - amino-1-hydroxybenzene-4-sulphonic acid by a known method with phenylformyl acetic acid ethyl ester in the presence of copper salts and then saponifying the acetylamino group with dilute caustic soda lye) are dissolved in 1200 parts of water with a pH of 6.5–7.0. 19 parts of β-chloropropionic acid chloride in 100 parts of acetone and an aqueous sodium carbonate solution are added simultaneously to this solution within 1 hour at 40–45° in such a way that the reaction always remains neutral. On completion of the condensation, the reaction product is precipitated by the addition of sodium chloride. The dyestuff is filtered off, washed with dilute sodium chloride solution and dried in vacuo at 40–45°. After drying, it is a dark powder which dissolves in water with a blue colour.

If cotton is impregnated with a 2% aqueous solution of this dyestuff thickened with sodium alginate, which solution contains 200 g. of urea and 20 g. of sodium bicarbonate per litre, and the goods, after a mild drying, are heated for 5 minutes at 130–135°, soaped hot, rinsed and dried, then a strong blue dyeing which is fast to washing is obtained.

EXAMPLE 9

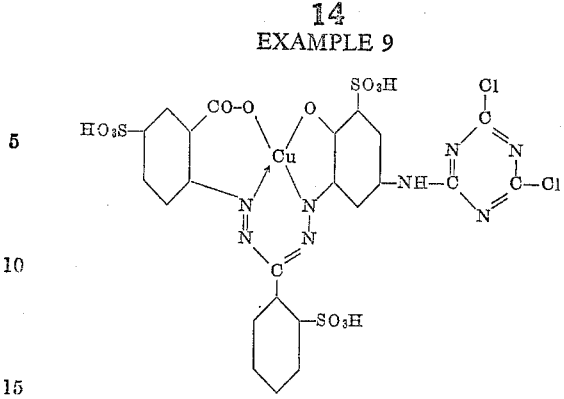

67.6 parts of the copper complex compound of N-(2-hydroxy - 5 - aminophenyl - 3 - sulphonic acid)-N'-(2-carboxyphenyl - 4' - sulphonic acid) - ms-o-sulphonic acid phenylformazane (obtained by coupling diazotised 4-acetylamino-2-amino-1-hydroxybenzene-6-sulphonic acid with the hydrazone from benzaldehyde-2-sulphonic acid and phenyl hydrazine-2-carboxylic acid-4-sulphonic acid by the known method and then coppering and saponifying the acetylamino group with diluted caustic soda lye), are dissolved in 1200 parts of water with a neutral reaction. This solution is added dropwise within 2 hours at 0–2° to an aqueous, finely dispersed suspension of 22.2 parts of cyanuric chloride, obtained by pouring a solution of cyanuric chloride in 150 parts of acetone into ice water, the addition being made at a pH of 2.0–2.5.

As soon as no more starting dyestuff can be traced, the dyestuff of the above formula is precipitated by the addition of sodium chloride solution, filtered off, washed with dilute sodium chloride solution and finally dried in vacuo. The dyestuff dissolves in water with a blue colour.

Cotton is treated at 20° in the foulard with a 1% solution of the new dyestuff which solution also contains 15 parts of sodium carbonate per litre, rolled up and left for 2 hours at room temperature. The goods are then rinsed and soaped at the boil for 30 minutes. A beautiful, fast blue dyeing is obtained.

EXAMPLE 10

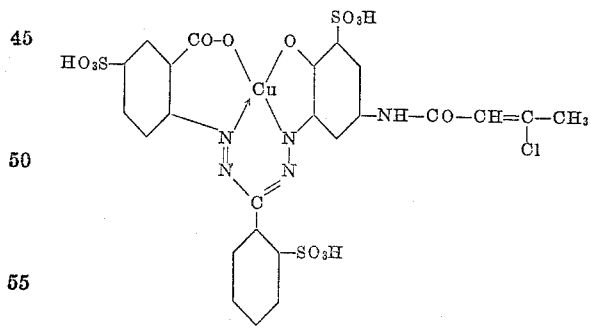

61.5 parts of N-(2-hydroxy-5-aminophenyl-3-sulphonic acid) - N' - (2-carboxyphenyl-4'-sulphonic acid)-ms-o-sulphophenylformazane (obtained by coupling the diazonium compound from 4-acetylamino-2-amino-1-hydroxybenzene-6-sulphonic acid with the hydrazone from benzaldehyde-2-sulphonic acid and phenyl hydrazine-2-carboxylic acid-4-sulphonic acid and then saponifying the acetylamino group with dilute caustic soda lye), are dissolved in 1200 parts of water with a pH of 6.0–6.5°. 21 parts of β-chlorocrotonic acid chloride in 100 parts of acetone and an aqueous solution of sodium carbonate are added dropwise simultaneously within 1 hour at 45–50° to this solution in such a way that the reaction mixture always remains neutral. As soon as no more free amine can be traced, the dyestuff is converted into the corresponding copper complex compound by the addition of a copper sulphate solution (corresponding to 7 parts of copper), in the known manner. The copper-containing dyestuff is then precipitated by the addition of sodium chloride, filtered off, washed with dilute sodium chloride solution and carefully dried in vacuo.

It is a dark powder which dissolves in water with a blue colour.

2 parts of the dyestuff are dissolved in 4000 parts of water and 20 parts of caustic soda lye 36° Bé are added. 100 parts of cotton are introduced into the dyebath at 40–45° and the bath is heated within 30 minutes to 80–85°. At the same time sufficient sodium chloride is added so that the final content is 150 parts per litre. Dyeing is performed for 1 hour at 80–85°, whereupon the goods are rinsed and soaped at the boil for 30 minutes. A fast blue dyeing is obtained.

*Table 4*

| No. | Aminoformazyl duestuff | Metal | Acylating agent | Acylating conditions pH | Acylating conditions Temp.° C | Shade |
|---|---|---|---|---|---|---|
| 1 | N-(2-hydroxy-5-aminophenyl-3-sulphonic acid)-N'-(2'-hydroxyphenyl-3',5'-disulphonic acid)-ms-phenylformazane. | Cu | 2,4,6-trichloropyrimidine | 6.0–6.5 | 40–45 | Blue. |
| 2 | do | Cu | 5-gromo-2,4,6-trichloropyrimidine | 6.0–6.5 | 30–35 | Do. |
| 3 | do | Cu | 5-methyl-2,4,6-trichloropyrimidine | 7.0–7.5 | 80–85 | Do. |
| 4 | do | Cu | 2-amino-4,6-dichloro-1,3,5-triazine | 5.0–5.5 | 30–35 | Do. |
| 5 | do | Cu | 2-ureido-4,6-dichloro-1,3,5-triazine | 5.0–5.5 | 30 35 | Do. |
| 6 | do | Cu | 2-phenylamino-4,6-dichloro-1,3,5-triazine | 6.0–6.5 | 40–45 | Do. |
| 7 | do | Cu | 2-(2'-sulphophenylamino)-4,6-dichloro-1,3,5-triazine. | 6.0–6.5 | 40–45 | Do. |
| 8 | do | Cu | 2-(2',5'-disulphophenylamino)-4,6-dichloro-1,3,5-triazine. | 6.0–6.5 | 40–45 | Do. |
| 9 | do | Cu | 2-methoxy-4,6-dichloro-1,3,5-triazine | 5.0–5.5 | 30–35 | Do. |
| 10 | do | Cu | β-Chloropropionic acid chloride | 6.5–7.0 | 30–35 | Do. |
| 11 | do | Cu | β-Bromocrotonic acid chloride | 6.5–7.0 | 30–35 | Do. |
| 12 | do | Cu | β-Chloroacrylic acid chloride | 6.5–7.0 | 30–35 | Do. |
| 13 | do | Cu | 2,6-dichloropyrimidine-4-carboxylic acid chloride. | 6.5–7.0 | 30–35 | Do. |
| 14 | do | Cu | Chloromaleic acid anhydride | 6.5–7.0 | 30 35 | Do. |
| 15 | do | Cu | m-(β-Chloroethylsulphamyl)-benzoyl chloride. | 6.5–7.0 | 30–35 | Do. |
| 16 | do | Ni | 2,4,5,6-tetrachloropyrimidine | 6.0–6.5 | 40–45 | Violet. |
| 17 | do | Ni | 2,4,6-trichloropyrimidine | 6.0–6.5 | 40 45 | Do. |
| 18 | do | Ni | β-Chloropropionic acid chloride | 6.5–7.0 | 30–35 | Do. |
| 19 | do | Ni | 2-amino-4,6-dichloro-1,3,5-triazine | 5.0–5.5 | 30–35 | Do. |
| 20 | do | Ni | 2-methoxy-4,6-dichloro-1,3,5-triazine | 5.0–5.5 | 30–35 | Do. |
| 21 | do | Ni | Chloromaleic acid anhydride | 6.5–7.0 | 30–35 | Do. |
| 22 | do | Ni | 2-(2',5'-disulphophenylamino)-4,6-dichloro-1,3,5-triazine. | 6.0–6.5 | 40–45 | Do. |
| 23 | do | Ni | 2-(3'-sulphophenylamino)-4,6-dichloro-1,3,5-triazine. | 6.0–6.5 | 40–45 | Do. |
| 24 | N-(2-hydroxy-5-aminophenyl-3-sulphonic acid)-N'-(2'-hydroxyphenyl-3',5'-disulphonic acid)-ms-p-chlorophenylformazane. | Ni | β-Chloroacrylic acid chloride | 6.5–7.0 | 30–35 | Do. |
| 25 | do | Ni | 2-ureido-4,6-dichloro-1,3,5-triazine | 5.0–5.5 | 30 35 | Do. |
| 26 | N-(2-hydroxy-3-aminophenyl-5-sulphonic acid)-N'-(2'-hydroxyphenyl-3',5'-disulphonic acid)-ms-phenylformazane. | Cu | 2,4,5,6-tetrachloropyrimidine | 6.0–6.5 | 40–45 | Blue. |
| 27 | do | Cu | 2,4,6-trichloropyrimidine | 6.0–6.5 | 40–45 | Do. |
| 28 | do | Cu | 5-bromo-2,4,6-trichloropyrimidine | 6.0–6.5 | 30–35 | Do. |
| 29 | do | Cu | 5-methyl-2,4,6-trichloropyrimidine | 7.0–7.5 | 80–85 | Do. |
| 30 | do | Cu | 2-amino-4,6-dichloro-1,3,5-triazine | 5.0–5.5 | 30–35 | Do. |
| 31 | do | Cu | 2-ureido-4,6-dichloro-1,3,5-triazine | 5.0–5.5 | 30–35 | Do. |
| 32 | do | Cu | 2-(2'-sulphophenylamino)-4,6-dichloro-1,3,5-triazine. | 6.0–6.5 | 40–45 | Do. |
| 33 | do | Cu | 2-methoxy-4,6-dichloro-1,3,5-triazine | 5.0–5.5 | 30–35 | Do. |
| 34 | do | Cu | β-Chlorocrotonic acid chloride | 6.5–7.0 | 30–35 | Do. |
| 35 | do | Cu | β-Bromocrotonic acid chloride | 6.5–7.0 | 30–35 | Do. |
| 36 | do | Cu | β-Chloroacrylic acid chloride | 6.5–7.0 | 30–35 | Do. |
| 37 | do | Cu | m-(β-Chloroethylsulphamyl)-benzoyl chloride. | 6.5–7.0 | 30–35 | Do. |
| 38 | do | Cu | Chloromaleic acid anhydride | 6.5–7.0 | 30–35 | Do. |
| 39 | do | Cu | 2,6-dichloropyrimidine-4-carboxylic acid chloride. | 6.5–7.0 | 30–35 | Do. |
| 40 | N-(2-carboxyphenyl-4-sulphonic acid)-N'-(2'-hydroxy-5'-aminophenyl-3'-sulphonic acid)-ms-naphthyl-(1)-formazane. | Cu | 2,4,5,6-tetrachloropyrimidine | 6.0–6.5 | 40–45 | Do. |
| 41 | do | Cu | Cyanuric chloride | 2.0–2.5 | 0–5 | Do. |
| 42 | N-(2-hydroxy-5-aminophenyl-3-sulphonic acid)-N'-[3'-carboxynaphthyl-(2)]-ms-o-sulphonic acid phenyl formazane. | Cu | 2,4,5,6-tetrachloropyrimidine | 6.0–6.5 | 40–50 | Do. |
| 43 | do | Cu | Cyanuric chloride | 2.0–2.5 | 0–5 | Do. |
| 44 | N-(2-hydroxy-5-aminophenyl-3-sulphonic acid)-N'-(2'-carboxy-phenyl-4'-sulphonic acid)-ms-p-sulphonic acid phenylformazane. | Cu | 2,4,5,6-tetrachloropyrimidine | 6.0–6.5 | 40–45 | Do. |
| 45 | do | Cu | 2,4,6-trichloropyrimidine | 6.0–6.5 | 40–45 | Do. |
| 46 | do | Cu | 5methyl-2,4,6-trichloropyrimidine | 7.0–7.5 | 80–85 | Do. |
| 47 | do | Cu | 2-amino-4,6-dichloro-1,3,5-triazine | 5.0–5.5 | 30–35 | Do. |
| 48 | do | Cu | 2-ureido-4,6-dichloro-1,3,5-triazine | 5.0–5.5 | 30–35 | Do. |
| 49 | do | Cu | 2-methoxy-4,6-dichloro-1,3,5-triazine | 5.0–5.5 | 30–35 | Do. |
| 50 | do | Cu | β-Chloropropionic acid chloride | 6.5–7.0 | 30–35 | Do. |
| 51 | N-(2-hydroxy-5-aminophenyl-3-sulphonic acid)-N'-(2'-carboxyphenyl-4'-sulphonic acid)-ms-2'',4''-disulphonic acid phenyl formazane. | Cu | β-Chlorocrotonic acid chloride | 6.7–7.0 | 30–35 | Do. |
| 52 | do | Cu | β-Chloroacrylic acid chloride | 6.5–7.0 | 30–35 | Do. |
| 53 | do | Cu | Chloromaleic acid anhydride | 2.0–2.5 | 0–5 | Do. |
| 54 | N-(2-hydroxy-5-aminophenyl-3-sulphonic acid)-N'-(2'-carboxyphenyl-4'-sulphonic acid)-ms-phenylformazane. | Cu | Cyanuric chloride | 6.0–6.5 | 40–50 | Do. |
| 55 | do | Cu | 2-(2',5'-disulphophenylamino)-4,6-dichloro-1,3,5-triazine. | 6.0–6.5 | 40–45 | Violet blue. |
| 56 | N-carboxyphenyl-4-sulphonic acid)-N'-(2'-carboxyphenyl-4'-sulphonic acid)-ms-p-aminophenylformazane. | Cu | do | 6.0–6.5 | 40–45 | Do. |
| 57 | do | Cu | 2,4,5,6-tetrachloropyrimidine | 6.0–6.5 | 40–45 | Blue. |
| 58 | N-(2-methylsulphonyl-aminophenyl)-N'-(2'-hydroxy-5'-aminophenyl-3'-sulphonic acid)-ms-2'',4''-disulphonic acid phenylformazane. | Cu | 2,4,5,6-tetrachloropyrimidine | 6.0–6.5 | 40–45 | Do. |
| 59 | do | Cu | 2,4,6-trichloropyrimidine | 6.0–6.5 | 40–45 | Do. |
| 60 | N-(2-ethylsulphonyl-aminophenyl)-N'-(2'-hydroxy-5'-aminophenyl-3'-sulphonic acid)-ms-2'',4''-disulphonic acid phenylformazane. | Cu | 2,4,5,6-tetrachloropyrimidine | 6.0–6.5 | 40–45 | Do. |

Further dyestuffs according to the invention which produce cotton dyeings having similarly good properties are obtained by using equivalent amounts of the components listed in Table 4 and observing the acylating conditions described, by the processes described in Examples 6 to 10 above.

EXAMPLE 11

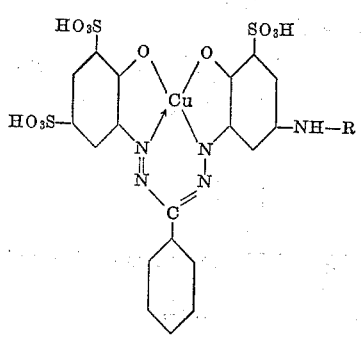

26.9 parts of 2-amino-1-hydroxybenzene - 4,6 - disulphonic acid are indirectly diazotised. The suspension of the diazonium compound is added dropwise at 0–10° while stirring vigorously to a suspension of 20.4 parts of phenylformyl acetic acid ethyl ester in 200 parts by volume of water, 250 parts by volume of dioxan and 10.5 parts by volume of a 10 N-caustic soda lye solution, calcinated sodium carbonate being simultaneously added so that after the addition of the diazonium compound, the reaction mixture has a weakly phenolphthalein alkaline reaction. On completion of the coupling, the pH is adjusted to 7 by the addition of concentrated hydrochloric acid, and the mixture is diluted and boiled. After the addition of sufficient 10 N-caustic soda lye to ensure a strong alkaline reaction until the end of the saponification, the reaction product is refluxed for 10 minutes. The pH of the solution of the saponification product is then adjusted to 7 with hydrochloric acid, a copper sulphate solution (corresponding to 7 parts of copper) is added and the whole is coupled at 0–10° with the diazonium salt, the reaction of which has been made neutral, obtained by diazotising 38.7 parts of a mixture consisting of 4-[2′,5′,6′-trichloropyrimidyl-(4′)-amino]-2-amino-1 - hydroxybenzene-6-sulphonic acid and 4-[4′,5′,6′-trichloropyrimidyl-(2′)-amino]-2-amino-1-hydroxybenzene-6 - sulphonic acid (produced by condensing 2-acetylamino-4-amino-1-hydroxybenzene-6-sulphonic acid with 2,4,5,6-tetrachloropyrimidine and then saponifying the acetylamino group at 90° with 10% aqueous hydrochloric acid).

After heating to 40–45°, the copper-containing formazane complex of the formula given above in which R is the 4,5,6-trichloropyrimidyl-(2) radical or the 2,5,6-trichloropyrimidyl-(4) radical, is precipitated by the addition of sodium chloride, filtered off, washed with sodium chloride solution and carefully dried in vacuo. It is a dark powder which dissolves in water with a blue colour.

Cotton is treated at 50° in the foulard with a 1% solution of this dyestuff which also contains 20 parts of sodium carbonate and 200 parts of urea per litre. The impregnated goods are dried, then heated for 4 minutes at 140–160° and finally soaped at the boil for 30 minutes. A level blue dyeing is obtained which is fast to boiling.

A similar dyestuff is obtained if, in the above example, the 4-trichloropyrimidylamino-2-amino-1 - hydroxybenzene-6-sulphonic acid is replaced by 35.2 parts of 4-dichloropyrimidylamino-2-amino-1-hydroxybenzene-6 - sulphonic acid.

What we claim is:
1. The dyestuffs of the general formula

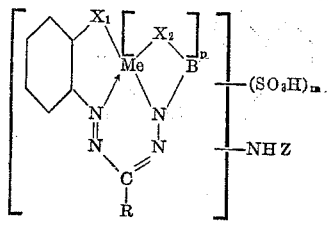

wherein

R represents a member selected from the group consisting of phenyl, chlorophenyl and naphthyl radicals,
B represents a member selected from from the group consisting of phenyl and naphthyl radicals,
$X_1$ and $X_2$ each represent a metal binding group in o-position to the azo bond, selected from the group consisting of $-O-$, $-COO-$ and $-NSO_2$-lower alkyl Z represents halogen-pyrimidyl with from two to three halogen atoms, the halogen atoms being identical and having atomic numbers from 17 to 35 inclusive,
Me represents a heavy metal selected from the group consisting of Cu and Ni,
$m$ represents an integer from 2 to 4 inclusive and
$p$ represents one of the numerals 0 and 1.

2. The dyestuffs of the general formula

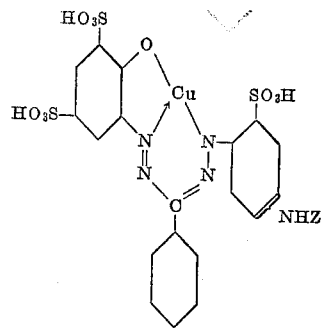

wherein Z represents halogen-pyrimidyl with from two to three halogen atoms, the halogen atoms being identical and having atomic numbers from 17 to 35 inclusive.

3. The dyestuff of the formula

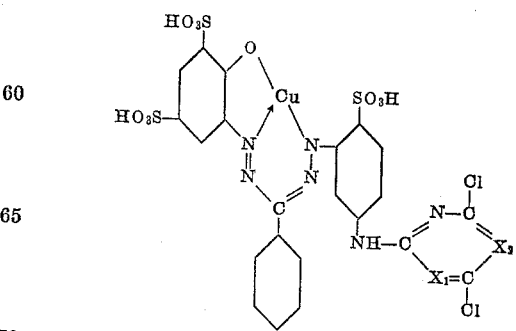

wherein of $X_1$ and $X_2$, the one is $=N-$ and the other is $-C=$
$\phantom{-}|$
$\phantom{-}Cl$ 4. The dyestuff of the formula

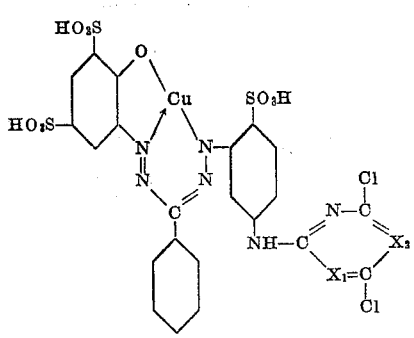

wherein of $X_1$ and $X_2$, the one is $=N-$ and the other is

5. The dyestuff of the formula

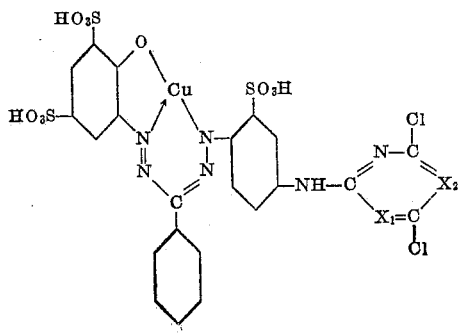

wherein of $X_1$ and $X_2$, the one is $=N-$ and the other is

6. The dyestuff of the formula

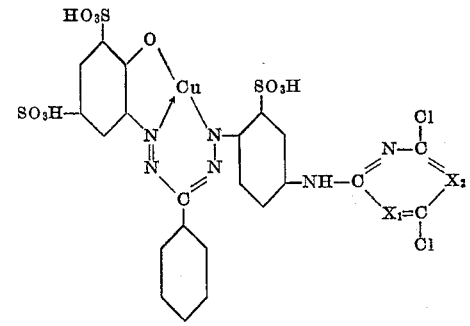

wherein of $X_1$ and $X_2$ the one is $-N=$ and the other is

References Cited in the file of this patent
UNITED STATES PATENTS 2,662,074 Brooks _____ Dec. 8, 1953
2,864,815 Ziegler _____ Dec. 16, 1958

OTHER REFERENCES

Wegmann: "Textil-Praxis," October 1958, pp. 1056–1058. (Available in Division 38.)

Bohnert: "Soc. of Dyers and Colourists," vol. 75, Number 12, December 1959, pp. 581–585.

Wegmann: "ibid," vol. 76, No. 4, April 1960, pp. 205–209. (Available in Science Library.)